United States Patent [19]

Tachika et al.

[11] Patent Number: 5,510,417
[45] Date of Patent: Apr. 23, 1996

[54] AQUEOUS POLYESTER DISPERSION SUITABLE FOR USE AS A COATING COMPOSITION

[75] Inventors: Hiroshi Tachika; Keiichiro Togawa; Hiroshi Fujimoto, all of Ohtsu, Japan

[73] Assignee: Toyo Boseki Kabushiki Kaisha, Osaka, Japan

[21] Appl. No.: 334,147

[22] Filed: Nov. 4, 1994

Related U.S. Application Data

[63] Continuation-in-part of Ser. No. 51,061, Apr. 21, 1993, abandoned.

[30] Foreign Application Priority Data

Apr. 21, 1992 [JP] Japan ................................. 4-100980

[51] Int. Cl.$^6$ ................................ C08J 3/03; C08K 3/20; C08L 77/00
[52] U.S. Cl. ........................... 524/608; 524/601; 524/603; 524/604; 524/605; 524/606; 528/295; 528/302; 528/305; 528/308
[58] Field of Search ...................... 524/601, 603, 524/604, 605, 606, 608; 528/295, 302, 305, 308

[56] References Cited

U.S. PATENT DOCUMENTS

| | | | |
|---|---|---|---|
| 4,304,901 | 12/1981 | O'Neill | 528/290 |
| 4,340,519 | 7/1982 | Kotera et al. | 523/414 |
| 4,525,524 | 6/1985 | Tung et al. | 524/601 |
| 4,585,854 | 4/1986 | Tung et al. | 528/295 |
| 4,910,292 | 3/1990 | Blount | 528/272 |
| 4,963,652 | 10/1990 | Tortorici et al. | 524/604 |

*Primary Examiner*—Paul R. Michl
*Assistant Examiner*—U. K. Rajguru
*Attorney, Agent, or Firm*—Leydig, Voit & Mayer, Ltd.

[57] ABSTRACT

An aqueous dispersion comprising (A) a polyester comprising an aromatic dicarboxylic acid, an addition product of bisphenol A with ethylene oxide and/or propylene oxide, and a dicarboxylic acid having a metal base of sulfonic acid and/or a polyol having a metal base of sulfonic acid, (B) a water-soluble organic compound having a boiling temperature of about 60° C. to about 250° C., (C) water and (D) a neutralizer; the amounts of the components A, B, C and D satisfying the following ratios of (1) to (3):

(1) A/B/C being about 1% to about 70% by weight/about 0% to about 69% by weight/about 9% to about 99% by weight, (2) B/(B+C) being about 0 to about 0.7 (weight ratio), and (3) the equivalent ratio of D to A being about 0.1 to about 20.

21 Claims, No Drawings

AQUEOUS POLYESTER DISPERSION SUITABLE FOR USE AS A COATING COMPOSITION

This is a continuation-in-part application of U.S. patent application Ser. No. 08/051,061, filed Apr. 21, 1993. abandoned

FIELD OF THE INVENTION

The present invention relates to an aqueous dispersion comprising a polyester as an effective ingredient, and, more particularly, to an aqueous dispersion comprising a polyester which is particularly suitable for a primer for metal plates or cans to be precoated and a sizing agent.

BACKGROUND OF THE INVENTION

Organic solvents have been used in large amounts in the fields of paints, inks, coating agents, adhesives, and various treating agents for textiles and paper. However, the use of organic solvents has become increasingly problematic over the years due to growing concern over conservation of petroleum resources, prevention of environmental pollution, enforcement of regulations of organic solvent effluents, such as RACT, restrictions on organic solvents brought about by revision of fire laws, and intensifying regulations on solvent concentration in the work environment.

In view of the above, various polyester compositions, such as a high solid polyester composition, a nonaqueous polyester dispersion, an aqueous polyester dispersion, a polyester emulsion, and a solventless polyester composition, have been proposed, and many of these already have been put to use. The aqueous polyester dispersion is the most promising for general use because of its ease of handling.

While most of the resins currently in use are hydrophobic, the resins for use as primers must have even higher hydrophobicity, along with a high corrosion resistance, making dispersal or dissolution of the hydrophobic resins in water difficult. Further, once the hydrophobic resin is dispersed or dissolved in water, it is difficult to render a resulting film resistant to water, corrosion and weather. These technical problems are commonly seen in any resin, and polyester is no exception.

It is known that polyester is dispersed or dissolved in water by copolymerization with a hydrophilic raw material, such as a compound containing a metal base of sulfonic acid, a polyalkylene glycol or an aliphatic dicarboxylic acid, which may be copolymerized singly or in combination. Regardless of which method is used, a large amount of a hydrophilic raw material must be used to achieve excellent water-solubility or water-dispersibility, and such use results in a film with very poor water and corrosion resistance.

For example, Japanese Patent Examined Publication No. 40878/1972 proposes the use of a compound containing a metal base of sulfonic acid in a proportion of not less than 8% by mole of the entire acid component of a polyester and a polyethylene glycol in a proportion of not less than 20% by mole of the entire glycol component of the polyester. Japanese Patent Unexamined Publication No. 121336/1975 also proposes the use of a compound containing a metal base of sulfonic acid and a polyethylene glycol. When used as a top coat or a coating agent, a polyester containing a large amount of polyethylene glycol hardly proves practical, due to the poor adhesion between the film coating and a substrate and the degraded appearance of the coating, such as reduced gloss, the occurrence of blisters and/or changes in hue, which are attributable to the absorption of water or moisture caused by a polyester having too high hydrophilicity. Even more impractical is the use of such a polyester as a primer, where corrosion resistance is required.

In order to improve the water resistance of a film coating of the aqueous dispersion described above, Japanese Patent Examined Publication No. 058092/1986 proposed an aqueous dispersion, wherein a polyester prepared from a polyalkylene glycol containing no aliphatic ether bond, such as polyethylene glycol, as a glycol component, and an aromatic dicarboxylic acid containing a metal base of sulfonic acid, are dispersed in an amphipathic solvent, as a means to achieve superior water dispersibility and water resistance. Although the resulting film coating is superior in water resistance, the film has insufficient resistance to boiling water, which requires higher resistance than does resistance to water below boiling temperature, and corrosion resistance, and is not entirely satisfactory in film appearance, e.g., smoothness and surface gloss. Japanese Patent Unexamined Publication No. 233127/1985 discloses a good aqueous dispersion obtained from a polyester comprising terephthalic acid and ethylene glycol by utilizing a metal base of sulfonic acid and terminal carboxylic group, but the film thereof lacks sufficient corrosion resistance as required of a primer for pre-coating. It should be noted that, when a glycol having high hydrophobicity is used as required of a resin for a primer, dispersibility or solubility in water is insufficient.

Accordingly, an object of the present invention is to provide an aqueous dispersion suitable for producing film coatings having superior processability and corrosion, boiling water, chemical and scratch resistance.

SUMMARY OF THE INVENTION

In accordance with the present invention, there is provided an aqueous dispersion comprising:

(A) a polyester having about 0.45 to about 1.00 carboxyl groups per chain end, and comprising, as a polycarboxylic acid component, an aromatic dicarboxylic acid in a proportion of about 70% to about 100% by mole based on the entire acid component, an addition product of bisphenol A and ethylene oxide and/or propylene oxide as a polyol component, which is of the formula I:

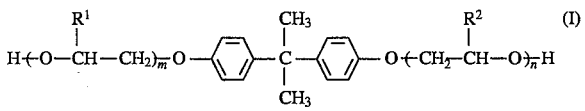

wherein each of $R^1$ and $R^2$ is a hydrogen or a methyl, and each of m and n is a numeral not less than 1, provided that $2 \leq m+n \leq 6$, in a proportion of about 30% to about by mole based on the entire polyol component, and at least one of a dicarboxylic acid containing a metal base of sulfonic acid in a proportion of about 0.01% to about 10% by mole based on the entire acid component, and a polyol containing a metal base of sulfonic acid in a proportion of about 0.01% to about 10% by mole based on the entire polyol component, (B) a water-soluble organic compound having a boiling point of about 60° C. to about 250° C., (C) water, and (D) a neutralizer; wherein the amounts of said components (A), (B), (C) and (D) satisfy the following ratios (1) to (3):

(1) A/B/C being about 1% to about 70% by weight/about 0% to about 69% by weight/about 9% to about 99% by weight, (2) B/(B +C) being about 0 to about 0.7 (weight ratio), and (3) the equivalent ratio of D to A being about 0.1 to about 20;

said dispersion being suitable for producing coatings having corrosion, chemical, boiling water, and coin-scratch resistance and processibility.

DETAILED DESCRIPTION OF THE INVENTION

When used as a primer for metal plates, while the dispersion of the present invention is an aqueous system, the dispersion and a resin composition for an aqueous paint using the dispersion can generate films having corrosion, boiling water, chemical and scratch resistance and processability equal or superior to those of solvent-type polyester primers. Particularly, excellent water dispersibility can be obtained even with a low concentration of a metal base of sulfonic acid when used in combination with a carboxylic group, and extremely excellent corrosion resistance can be obtained when the metal base is used at a low concentration. Also, the metal base of sulfonic acid and the carboxylic group contained in the polyester are conducive to excellent adhesion to metals and superior scratch resistance compared to the above-mentioned solvent-type polyesters. Also, better processability than and a corrosion resistance equal to or superior to that of a solvent-type epoxy resin are attained. The top coats using the aqueous dispersion possess excellent stain resistance, which has never been achieved by conventional solvent-type polyesters for precoating.

At least about 70% by mole of the entire acid component of the polyester (A) is an aromatic dicarboxylic acid. The aromatic dicarboxylic acid is exemplified by terephthalic acid, isophthalic acid, orthophthalic acid, 2,6-naphthalenedicarboxylic acid, diphenyl-p,p'-dicarboxylic acid, diphenyl-m,m'-dicarboxylic acid, diphenylmethane-p,p'-dicarboxylic acid, 2,2'-bis(4-carboxyphenyl)propane or indenedicarboxylic acid. These carboxylic acids may be used alone or as a mixture. While the aromatic dicarboxylic acid can be optionally selected according to film properties and economy, it is preferable to use a combination of terephthalic acid and isophthalic acid with regard to film properties, particularly mechanical properties and dispersibility or solubility in water. More preferably, terephthalic acid is used in a proportion of about 40% to about 60% by mole based on the entire acid component. A carboxylic acid having three or more functional groups, such as trimellitic anhydride, may be used in a proportion of not more than about 10% by mole based on the entire acid component.

The polyester (A) may contain an aliphatic dicarboxylic acid, such as succinic acid, glutaric acid, adipic acid, azelaic acid, sebacic acid, dodecanedioic acid or dimer acid, and/or an alicyclic dicarboxylic acid, such as cyclohexanedicarboxylic acid, tetrahydrophthalic acid or hexahydroisophthalic acid, in a proportion of less than about 30% by mole, preferably not more than about 10% by mole, of the entire acid component as occasion demands. The use of the aliphatic or alicyclic dicarboxylic acid requires attention, because they can degrade corrosion resistance of the film and storage stability of the aqueous dispersion. It is preferable to use sebacic acid in a proportion of not more than about 10% by mole, more preferably not more than about 5% by mole, of the entire acid component in consideration of film properties and storage stability.

The polyester (A) contains a dicarboxylic acid containing a metal base of sulfonic acid in a proportion of about 0.01% to about 10% by mole of the entire acid component and/or a polyol containing a metal base of sulfonic acid in a proportion of about 0.01% to about 10% by mole of the entire polyol component. The dicarboxylic acid containing a metal base of sulfonic acid is exemplified by a metal salt of sulfoterephthalic acid, 5-sulfoisophthalic acid, 4-sulfonaphthalene-2,7-dicarboxylic acid or 5-[4-sulfophenoxy]-isophthalic acid. The polyol containing a metal base of sulfonic acid is exemplified by a metal salt of 2-sulfo-1,4-butanediol or 2,5-dimethyl-3-sulfo-2,5-hexanediol. Examples of the metal salt are lithium, sodium, potassium, magnesium, calcium, copper and iron salts. Of these, particularly preferable is sodium 5-sulfoisophthalate. The proportion of the dicarboxylic acid containing a metal base of sulfonic acid or the polyol containing a metal base of sulfonic acid to be used is about 0.01% to about 10% by mole, preferably about 1% to about 4% by mole, more preferably about 1% to about 3% by mole of the entire acid component or the entire polyol component. When both the dicarboxylic acid containing a metal base of sulfonic acid and the polyol containing a metal base of sulfonic acid are used at the same time, they are used in such amounts that make the total molar percent of the two components not more than about 10. When the dicarboxylic acid and/or the polyol containing a metal base of sulfonic acid are/is used in a proportion of more than about 10% by mole, water resistance and corrosion resistance become poor, whereas when used in a proportion of less than about 0.01% by mole, good dispersibility or solubility in water cannot be obtained. The polyester (A) contains an addition product of bisphenol A and ethylene oxide and/or propylene oxide having the formula I:

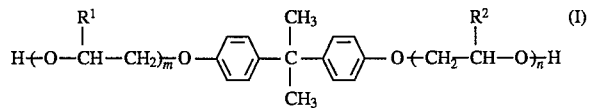

wherein each of $R^1$ and $R^2$ is a hydrogen or a methyl, and each of m and n is a numeral not less than 1, provided that $2 \leq m+n \leq 6$, in a proportion of about 30% to about 95% by mole based on the entire polyol component. The polyol (I) is particularly important when using the aqueous dispersion as a primer. When the proportion of the polyol (I) is less than about 30% by mole, good corrosion resistance cannot be obtained. Preferably, it is used in a proportion of about 40% to about 70% by mole based on the entire polyol component in view of corrosion resistance and economy.

Examples of the polyol other than the polyol (I) are ethylene glycol, propylene glycol, 1,3-propanediol, 1,4-butanediol, 3-methyl-1,5-pentanediol, 2-ethyl-2-butylpropanediol neopentyl glycol, 1,5-pentanediol, 1,6-hexanediol, dimethylolheptane, dimethylolpentane, diethylene glycol, triethylene glycol, cyclohexanedimethanol, TCD glycol, polyethylene glycol, polypropylene glycol, polytetramethylene glycol, bisphenol S derivatives with ethylene oxide or propylene oxide and bisphenol F derivatives with ethylene oxide or propylene oxide. Of these, diethylene glycol gives good dispersibility or solubility in water to the dispersion obtained, and also good corrosion resistance and chemical resistance to the film obtained. The diethylene glycol is used in a proportion of preferably about 30% to about 60% by mole, more preferably about 40% to about 60% by mole, based on the entire glycol component. While the ethylene glycol also gives good corrosion and chemical resistance, it is preferably used in a proportion of less than about 20% by mole relative to the entire glycol component, for the reason that the use in a proportion of not less than about 20% by mole of the ethylene glycol leads to insufficient dispersibility or solubility in water.

A polyol having three or more functional groups, such as glycerol, trimethylolpropane or pentaerythritol, may be used in a proportion of not more than about 10% by mole of the entire polyol component.

The polyester (A) may include known dicarboxylic acids or polyols containing a metal base of an acid phosphorus compound.

The polyester (A) must be made to have a certain number of carboxyl chain ends so as to retain water dispersibility even when the concentration of the metal base of sulfonic acid, which adversely affects film properties, such as water resistance, is lowered. The number of carboxyl groups per chain end can be calculated from the acid value by using the following formula:

Carboxyl groups per chain end =$Mn \times (Acid\ value/10^6)/(Functionality)$ wherein Mn is the number average molecular weight, acid value is expressed as equivalent/$10^6$g and is determined by titration with sodium hydroxide solution, and functionality is the number of chain ends per molecule. It has been discovered that the number of carboxyl groups per chain end should be in the range of about 0.45 to about 1.00 to achieve the desirable properties of water dispersibility and corrosion, boiling water, acid, alkali, and coin-scratch resistance of the coating. If the number of carboxyl groups per chain end is less than about 0.45 or greater than about 1.00, then the properties of the dispersion and the coating are adversely affected.

To impart the desired number of carboxyl ends, the polyester is subjected to an addition polymerization with a polyvalent acid anhydride, such as trimellitic anhydride or phthalic anhydride, at about 200° C. to about 230° C. under normal pressure.

When the polyester (A) is dispersed in water, the carboxyl group added by the above-mentioned method must be neutralized with a neutralizer (D) to dissociate. If neutralization with an alkali is not conducted, the carboxyl group does not dissociate and good water dispersibility cannot be obtained.

The neutralizer (D) is exemplified by ammonia, an amine, such as methylethanolamine, dimethylethanolamine, diethylethanolamine, N-methyl-diethanolamine, bis-hydroxypropyl-methylamine, tri-n-butylamine, triethylamine, bis-2-hydroxypropylamine, N-methylethanolamine, aminomethylpropanol, 3-amino-1-propanolamine, isopropanolamine, 2-amino-2-hydroxymethyl-1,3-propane-diol, aminomethyl-propanediol, cyclohexylamine or t-butylamine, a salt of a weak acid with a strong base, such as sodium carbonate or potassium carbonate, or a hydroxide of an alkali metal, such as sodium hydroxide or potassium hydroxide. If the neutralizer remains in the coating film after drying and curing, the film properties are adversely affected. For this reason, ammonia and amines, such as triethylamine and dimethylethanolamine, which undergo volatilization after drying and curing, are preferred.

In the present invention, the polyester (A) may be used alone or in mixture with other polyesters, if necessary.

The polyester (A) is preferably amorphous and has a glass transition temperature of about −30° C. to about 80° C., more preferably about 30° C. to about 75° C. When a polyester having a glass transition temperature of about −30° C. to about 80° C. is used, the film obtained does not show adhesion, thus rendering its water resistance superior, and the aqueous dispersion obtained shows low viscosity, thus making the coating property desirable.

The polyester (A) preferably has a number average molecular weight of about 2,500 to about 30,000. A film prepared using a polyester having a molecular weight of about 2,500 to about 30,000 is excellent in toughness, and the aqueous dispersion prepared using same has low viscosity, thus enabling use of the polyester in the dispersion in greater amounts.

The polyester (A) is suitably prepared by a known method, which can be employed optionally. The polyester (A) obtained can be mixed with an amino resin, an epoxy compound or an isocyanate compound in a molten state or a solution state in the water-soluble organic compound (B) to be mentioned below. Also, the polyester (A) may be reacted partially with the above-mentioned resin or compound, and the thus-obtained partially-reacted product can serve as one ingredient of the aqueous dispersion of the present invention.

The water-soluble organic compound (B) is used in the present invention for increasing affinity of the polyester (A) for water, which has been intentionally lowered to aid the dispersibility of the polyester (A) in water. The coexistence of the polyester (A) and the water-soluble organic compound (B) in water gives a good aqueous dispersion.

The water-soluble organic compound (B) is an organic compound having a solubility of about 20 g or more per liter of water at 20° C. The water-soluble organic compound (B) is exemplified by an aliphatic or alicyclic alcohol, ether, ester or ketone. Examples of the compound (B) are monohydric alcohols, such as methanol, ethanol, n-propanol, isopropanol, n-butanol, isobutanol, sec-butanol and tert-butanol, glycols, such as ethylene glycol and propylene glycol, alkyl ethers of ethylene glycol, such as methyl cellosolve, ethyl cellosolve and n-butyl cellosolve and their acetates, alkyl ethers of diethylene glycol, such as ethyl carbitol and n-butyl carbitol and their acetates, alkyl ethers of propylene glycol and their acetates, ethers, such as dioxane and tetrahydrofuran, esters, such as ethyl acetate, and ketones, such as methyl ethyl ketone, cyclohexanone, cyclooctanone, cyclodecanone and isophorone. Of these, n-butyl cellosolve, n-butyl carbitol and monoethyl ether of propylene glycol are particularly preferred. These water-soluble organic compounds (B) may be used alone or as a mixture.

The water-soluble organic compound (B) must have a boiling point of about 60° C. to about 250° C. When the boiling point of the compound (B) is less than about 60° C., a temperature sufficient for mixing the polyester (A) with, and dissolving or dispersing same in the organic compound (B), cannot be easily maintained. On the other hand, when the boiling point is higher than about 250° C., dryability of the film formed from an aqueous dispersion containing such a water-soluble organic compound is poor.

The aqueous dispersion of the present invention is prepared, for instance, by previously mixing the polyester (A) with the water-soluble organic compound (B) at about 50° C. to about 200° C. to dissolve the polyester (A) in the compound (B), and adding water (C) in which a neutralizer (D) has been dissolved, or by adding the water in which the neutralizer (D) has been dissolved, to a mixture of the polyester (A) and the organic compound (B) and stirring the resulting mixture at about 40° C. to about 120° C.

The mixing ratio of the polyester (A), the water-soluble organic compound (B), the water (C) and the neutralizer (D)

is an important factor for keeping the performances Of the aqueous dispersion at a desired level, and it is necessary to satisfy the following ratios (1) to (3).

(1) A/B/C being about 1% to about 70% by weight/about 0% to about 69% by weight/about 9% to about 99% by weight, (2) B/(B+C) being about 0 to about 0.7 (weight ratio), and (3) the equivalent ratio of D to A being about 0.1 to about 20.

When the amount of the polyester (A) is less than 1% by weight based on the total of (A), (B) and (C), the aqueous dispersion obtained shows so low a viscosity as to allow repelling of the paint containing the aqueous dispersion upon application of the coating. When the proportion of the polyester (A) is more than about 70% by weight, the viscosity of the aqueous dispersion becomes undesirably high.

When the water-soluble organic compound (B) is used, a preferable weight ratio of B/(B+C) is about 0.05 to about 0.7, in which range the water-dispersibility of the dispersion and the transparency of the film become excellent, and the good coating achieved result in a superior film appearance. When the weight ratio is more than about 0.7, problems, such as a low flash point, occur.

The neutralizer (D) is used in an amount such that the equivalent ratio of (D) to (A) is about 0.1 to about 20, preferably about 1.0 to about 2.0. When this equivalent ratio is less than about 0.1, carboxyl groups cannot be dissociated sufficiently, such that good dispersibility in water cannot be obtained. When the equivalent ratio is more than about 20, negative effects, such as the neutralizer (D) remaining in the film coating after drying, thereby degrading water resistance, and/or the polyester (A) hydrolyzing during storage of the aqueous dispersion, can be observed.

The aqueous dispersion of the present invention may be used alone, or together with at least one crosslinking agent selected from amino resins, epoxy compounds and isocyanate compounds.

The amino resin includes, for instance, addition products of formaldehyde, such as urea, melamine and benzoguanamine and their alkyl ether compounds, with an alcohol having about 1 to 6 carbon atoms. The amino resin is concretely exemplified by methoxylated methylolurea, methoxylated methylol-N,N-ethyleneurea, methoxylated methyloldicyandiamide, methoxylated methylolmelamine, methoxylated methylolbenzoguanamine, butoxylated methylolmelamine or butoxylated methylolbenzoguanamine, with preference given to methoxylated methylolmelamine and methylolbenzoguanamine. These amino resins may be used alone or upon mixing with one another.

The epoxy compound is exemplified by diglycidyl ether of bisphenol A or its oligomer, diglycidyl ether of hydrogenated bisphenol A or its oligomer, diglycidyl ester of orthophthalic acid, diglycidyl ester of isophthalic acid, diglycidyl ester of terephthalic acid, diglycidyl ester of p-oxybenzoic acid, diglycidyl ester of tetrahydrophthalic acid, diglycidyl ester of hexahydrophthalic acid, diglycidyl ester of succinic acid, diglycidyl ester of adipic acid, diglycidyl ester of sebacic acid, ethylene glycol diglycidyl ether, propylene glycol diglycidyl ether, 1,4-butanediol diglycidyl ether, 1,6-hexane-diol diglycidyl ether, polyalkylene glycol diglycidyl ethers, triglycidyl ester of trimellitic acid, triglycidyl isocyanurate, 1,4-diglycidyl oxybenzene, diglycidyl propyleneurea, glycerol triglycidyl ether, trimethylolethane triglycidyl ether, trimethylolpropane triglycidyl ether, pentaerythritol tetraglycidyl ether or triglycidyl ether of glycerolalkyleneoxide addition product.

The isocyanate compound includes, for instance, aromatic diisocyanates, aliphatic diisocyanates and polyisocyanates having three or more functional groups, and low molecular weight compounds and high molecular weight compounds. The isocyanate compound is exemplified by tetramethylenediisocyanate, hexamethylenediisocyanate, toluenediisocyanate, diphenylmethanediisocyanate, hydrogenated diphenylmethane-diisocyanate, xylylenediisocyanate, hydrogenated xylylenediisocyanate or isophorone diisocyanate or a trimer of the isocyanate compound as mentioned above, or a reaction product containing an isocyanate group at the ends, prepared by reacting an excess of isocyanate compound mentioned above with a low molecular weight compound having an active hydrogen, such as ethylene glycol, propylene glycol, trimethylolpropane, glycerol, sorbitol, ethylene diamine, monoethanolamine, diethanolamine or triethanolamine, or a high molecular weight compound having an active hydrogen, such as a polyester polyol, a polyether polyol or a polyamide.

A preferred isocyanate compound is a blocked isocyanate. The blocking agent is exemplified by a phenol compound, such as phenol, thiophenol, methyl thiophenol, ethyl thiophenol, cresol, xylenol, resorcinol, nitrophenol or chlorophenol, an oxime, such as acetoxime, methyl ethyl ketoxime or cyclohexanoneoxime, an alcohol, such as methanol, ethanol, propanol or butanol, an alcohol substituted with a halogen, such as ethylene chlorohydrin or 1,3-dichloro-2-propanol, a tert-alcohol, such as t-butanol or t-pentanol, a lactam, such as $\epsilon$-caprolactam, $\gamma$-valerolactam, $\delta$-butyrolactam, or $\beta$-propiolactam, an aromatic amine, an imide, an active methylene compound, such as acetyl acetone, an ester of acetoacetic acid or ethyl malonate, a mercaptan, an imine, a urea, a diallyl compound, or sodium bisulfite. The blocked isocyanate can be obtained by subjecting the above-mentioned isocyanate compound to an addition reaction with a blocking agent by a suitable method conventionally known.

The crosslinking agent may be used together with an accelerator. The crosslinking agent may be added to the aqueous dispersion of the present invention, or may be added previously to the water-soluble organic compound (B) or a mixture of the compound (B) and the water (C) for dissolution or dispersion, and the method for the addition may be suitably selected depending on the kind of the crosslinking agent.

The present invention is specifically described by the following Examples, wherein all parts and % are by weight unless otherwise noted.

Physical properties of a polyester, an aqueous dispersion and a film prepared from the aqueous dispersion were determined as follows:

Physical properties of polyester and aqueous dispersion (1) Reduced viscosity $\eta$sp/c (dl/g):

A polyester was thoroughly dried (dry weight: 0.10 g) and dissolved in 25 ml of a mixed solvent of phenol and tetrachloroethane (weight ratio: 6/4), and the reduced viscosity of the polyester was determined at 30° C.

(2) Molecular weight:

An average molecular weight was determined according to GPC (relative to standard polystyrene).

(3) Acid value:

A sample (0.2 g) was exactly weighed and dissolved in 20 ml of chloroform, and the mixture was titrated with a 0.01N ethanol solution of potassium hydroxide, using phenolphthalein as an indicator.

(4) Glass transition temperature:

A glass transition temperature was determined at a heating rate of 20° C./minute by using a differential scanning calorimeter (DSC). A 5 mg sample was taken in an aluminum vessel and crimped with a holding lid.

(5) Composition analysis of polyester:

A composition of a polyester was analyzed by nuclear magnetic resonance (NMR).

(6) Dispersion stability:

An aqueous dispersion was stored at normal temperature for one month, and was visually observed.

In the Table, each symbol denotes the following: ○: Fine Δ: A small amount of precipitate or gel was produced. X: Separation or gellation X X: Good dispersion could not be obtained at an initial stage.

Film properties:

A specimen for testing film properties and coating compositions was prepared as follows. In the following description, the term "solid matter" is used to refer to the amount of solids in an aqueous dispersion, which is expressed by part by weight.

(1) Preparation of an aqueous primer:

A glass bottle was charged with 100 parts (solid matter) of an aqueous dispersion obtained in each of Examples 1–7 and Comparative Examples 1–6, 10 parts (solid matter) of CYMEL 303, which is an alkyl-etherified aminoformaldehyde resin (made by MITSUI CYANAMIDE CORPORATION, Japan), 0.25 part of p-toluenesulfonic acid as an accelerator, 30 parts of zinc chromate, 50 parts of titanium oxide and 250 parts of glass beads (diameter: 5 mm), and the mixture was stirred. The mixture was shaken for 4 hours in a paint shaker to give an aqueous primer.

(2) Preparation of a solvent primer:

A glass bottle was charged with 100 parts (solid matter) of the polymer for a solvent primer described in Comparative Example 7 or 8, 10 parts (solid matter) of CYMEL 303, 0.25 part of p-toluene-sulfonic acid, 30 parts of zinc chromate, 50 parts of titanium oxide and 250 parts of glass beads (diameter: 5 mm), and the mixture was stirred. The mixture was shaken for 4 hours in a paint shaker to give a solvent primer.

(3) Preparation of a top coat:

A glass bottle was charged with 20 parts (solid matter) of Byron 200, which is a polyester copolymer made by Toyo Boseki Kabushiki Kaisha, Japan, 80 parts (solid matter) of Byron 500, 25 parts (solid matter) of CYMEL 325, which is an alkyl-etherified aminoformaldehyde resin, 0.25 part of p-toluenesulfonic acid, 125 parts of titanium oxide, 0.5 part of MK CONC, made by Kyoei Yushi Kagaku Kogyo Kabushiki Kaisha, Japan, as a leveling agent, 400 parts of cyclohexanone and 250 parts of glass beads (diameter: 5 mm), and the mixture was stirred. The mixture was shaken for 4 hours in a paint shaker to give a top coat.

(4) Preparation of a coated steel plate (specimen) for determination of film properties:

A zinc-electroplated steel plate (thickness: 0.5 mm) was subjected to chromating, the plate was coated with the primer as mentioned above by a bar coater such that the thickness of the resulting dry film was 5 μm, and the primer film was baked at 220° C. for 50 seconds. After cooling, the top coat as mentioned above was coated on the primer film by a bar coater such that the thickness of the resulting dry film was 20 m, allowed to stand at 70° C. for 10 minutes, and baked at 235° C. for 60 seconds to give a coated steel plate.

Film properties were determined by using the thusobtained coated steel plate.

(5) Coin-scratch resistance:

The coated steel plate was scratched strongly with a coin (10 yen coin), and the surface was visually observed as to the peeling of the film.

In the Table, each symbol denotes the following: ⊙: The primer film was hardly peeled off from the substrate (steel plate), and the adhesion between the primer film and the top coat was fine, with only the very surface of the top coat having been gathered and broken. ○: The primer film was slightly peeled off from the substrate, but the adhesion between the primer film and the top coat was fine.

Δ: The primer film was hardly peeled off from the substrate, but the adhesion between the primer film and the top coat was poor, with the top coat having been easily peeled off.

X: The top coat was peeled off from the substrate, together with the primer film. That is, the adhesion between the primer film and the substrate was insufficient.

X X: The top coat was peeled off remarkably from the substrate, together with the primer film.

(6) Processability (T-bending method):

A coated steel plate was allowed to stand in a thermostatic chamber having a temperature of 5° C. for one hour or more. The plate was sequentially bent from 4T to 0T, and the cracks that occurred on the bent portion of the plate were examined with a magnifying lens with a magnification of 15. For example, the processability is said to be 3T by T-bending when a crack was not caused upon bending of three pieces of steel plates having the same thickness, which were layered at the bending site, but was caused upon bending of two steel plates. Accordingly, the smaller the number of the T-bending, the superior the processability.

(7) Boiling water resistance:

A coated steel plate was soaked in deionized water and boiled for 2 hours, and the film surface was observed.

In the Table, each symbol denotes the following:

○: No blister, adhesion 100/100 (cross-cut test)

Δ: Blisters observed

X: Numerous blisters observed (8) Corrosion resistance:

The film of a coated steel plate was cross-cut with a cutting knife, and a salt water spray test was conducted for 500 hours according to JIS K-5400. The cross-cut portion was peeled off with a pressure-sensitive adhesive tape, and the width of the film peeled off was measured.

In the Table, the width of the film peeled off is denoted as follows:

⊙: Less than 2 mm

○: From 2 to less than 3 mm

Δ: From 3 to less than 5 mm

X: Not less than 5 mm (9) Chemical resistance:

The back side of the coated steel plate was protected with a plastic, pressure-sensitive, adhesive tape, and was soaked in a 5% aqueous solution of sodium hydroxide or sulfuric acid at 25° C. for 6 hours. The film surface was observed and estimated according to the blister estimation standard prescribed in ASTM D714-56. Absence of abnormality is expressed as 10.

Preparation Example 1

Preparation of polyester (a):

A four-neck flask equipped with a stirrer, a thermometer and a fractionating column was charged with 255 parts of dimethyl terephthalate, 245 parts of dimethyl isophthalate, 15 parts of sodium 3,5-dicarbomethoxybenzene-sulfonate, 547 parts of BPE-20, which is an addition product of bisphenol A with 2 moles of ethylene oxide, made by SANYO CHEMICAL INDUSTRIES, LTD., Japan, 432 parts of diethylene glycol and 0.3 part of tetrabutyl titanate as a catalyst. The interesterification was conducted at 180° to 230° C. for 5 hours, while distilling away methanol produced from the system. Then, the fractionating column was removed and the pressure of the reaction system was reduced to 5 mmHg over 30 minutes, during which time the temperature was elevated to 210° C. The condensation polymerization was conducted at 230° C. for 30 minutes under a pressure of 0.3 mmHg. Then, the polymerization mixture was cooled to 200° C. at ordinary pressure under a nitrogen atmosphere. To the resulting mixture was added 15 parts of trimellitic anhydride, and an addition reaction with trimellitic anhydride was conducted by gradually heating the mixture to 230° C. to give a polyester (a).

NMR analysis showed that the composition of the obtained polyester (a) was terephthalic acid/isophthalic acid/sodium 5-sulfoisophthalate//BPE-20/diethylene glycol//trimellitic acid (post-addition)=50/48/2//65/35//2 (molar ratio). The polyester (a) was a transparent, pale-yellow resin having a reduced viscosity of 0.40 dl/g, a number average molecular weight of 8,000, an acid value of 123 equivalents/$10^6$g, and a glass transition temperature of 53° C. The number of carboxyls per chain end was 0.492.

Preparation Examples 2–7

The procedure of Preparation Example 1 was repeated to give polyesters (b)–(g) having the compositions shown in Table 1. The obtained polyesters (b)–(g) were characterized according to the resin properties by the methods as described above. The results are shown in Table 3.

Comparative Preparation Examples 1–6

The procedure of Preparation Example 1 was repeated to give polyesters (h)–(m) having the compositions shown in Table 2. The obtained polyesters (h)–(m) were characterized according to the resin properties by the methods as described above. The results are shown in Table 3.

TABLE 1

| Polyester | (a) | (b) | (c) | (d) | (e) | (f) | (g) |
|---|---|---|---|---|---|---|---|
| Polycarboxylic acid (molar ratio): | | | | | | | |
| Terephthalic acid | 50 | 50 | 47 | 55 | 51 | 50 | 50 |
| Isophthalic acid | 48 | 47 | 50 | 42 | 46 | 37 | 40 |
| Trimellitic acid | — | 1 | — | — | 1 | — | — |
| Sodium 5-sulfoisophthalate | 2 | 2 | 3 | 3 | 2 | 3 | 2 |
| Sebacic acid | — | — | — | — | — | 10 | 8 |
| Trimellitic acid (Post-addition) | 2 | 2 | 2 | 2 | 2 | 3 | 2 |
| Polyol (molar ratio): | | | | | | | |
| BPE-20 | 65 | 60 | 55 | 56 | — | 58 | 60 |
| BPE-40* | — | — | — | — | 43 | — | — |
| Ethylene glycol | — | — | 45 | 10 | 57 | 42 | — |
| Diethylene glycol | 35 | 40 | — | 34 | — | — | 40 |
| Neopentyl glycol | — | — | — | — | — | — | — |

*Addition product of bisphenol A with 4 moles of ethylene oxide made by SANYO CHEMICAL INDUSTRIES, LTD.

TABLE 2

| Polyester | (h) | (i) | (j) | (k) | (l) | (m) |
|---|---|---|---|---|---|---|
| Polycarboxylic acid (molar ratio): | | | | | | |
| Terephthalic acid | 52 | 50 | 49 | 50 | 50 | 49 |
| Isophthalic acid | 48 | 36 | 48 | 47 | 13 | 51 |

TABLE 2-continued

| Polyester | (h) | (i) | (j) | (k) | (l) | (m) |
|---|---|---|---|---|---|---|
| Trimellitic acid | — | 1 | — | 1 | — | — |
| Sodium 5-sulfoisophthalate | — | 13 | 3 | 2 | 2 | — |
| Sebacic acid | — | — | — | — | 35 | — |
| Trimellitic acid (Post-addition) | 2 | 2 | — | 2 | 2 | — |
| Polyol (molar ratio): | | | | | | |
| BPE-20 | 65 | 63 | 54 | — | 55 | 55 |
| BPE-40 | — | — | — | — | — | — |
| Ethylene glycol | — | — | 46 | 48 | 45 | 45 |
| Diethylene glycol | 35 | 37 | — | — | — | — |
| Neopentyl glycol | — | — | — | 52 | — | — |

TABLE 3

| | Resin Property | | | |
|---|---|---|---|---|
| Polyester | Mn* | Acid value** | Tg*** | Number of Carboxyls per chain end**** |
| (a) | 8,000 | 123 | 53 | 0.492 |
| (b) | 13,000 | 127 | 54 | 0.823 |
| (c) | 12,500 | 130 | 73 | 0.813 |
| (d) | 9,800 | 132 | 72 | 0.647 |
| (e) | 12,500 | 130 | 40 | 0.813 |
| (f) | 9,800 | 185 | 51 | 0.907 |
| (g) | 11,000 | 128 | 33 | 0.704 |
| (h) | 9,400 | 125 | 53 | 0.588 |
| (i) | 7,500 | 128 | 57 | 0.320 |
| (j) | 11,000 | 18 | 73 | 0.099 |
| (k) | 9,800 | 133 | 65 | 0.430 |
| (l) | 14,700 | 138 | 10 | 1.014 |
| (m) | 12,000 | 13 | 72 | 0.078 |

*number average molecular weight
**equivalent/$10^6$ g
***glass transition temperature (°C.)
****calculated based on formula presented at page 9, lines 3–4.

EXAMPLE 1

A 0.5 l flask was charged with 30 parts of polyester (a), 21 parts of butyl cellosolve, 49 parts of deionized water and 0.46 part of 28% aqueous ammonia, and the mixture was dispersed at 80° C. for 4 hours. The obtained aqueous dispersion was stable at normal temperature and was transparent.

An aqueous primer was prepared from the obtained aqueous dispersion and then specimens for testing the film properties were prepared by the above-mentioned methods. Using the specimens, the film properties were determined in the manner mentioned above. The film properties of processability, coin-scratch resistance, boiling water resistance, corrosion resistance, and chemical resistance were equal to or better than those of the films prepared from conventional solvent primers. Also, film appearance was fine. The results are shown in Table 5.

EXAMPLE 2–7

An aqueous dispersion was prepared in the same manner as in Example 1 using the components and the mixing ratios shown in Table 4. An aqueous primer was prepared from the obtained aqueous dispersion and then specimens for testing film properties were prepared by the above-mentioned method. Using the specimens, the film properties were determined in the manner mentioned above. The results are shown in Table 5.

TABLE 4

| Example No. | 1 | 2 | 3 | 4 | 5 | 6 | 7 |
|---|---|---|---|---|---|---|---|
| Component (A) | | | | | | | |
| Polyester Kind | (a) | (b) | (c) | (d) | (e) | (f) | (g) |
| Amount* | 30 | 35 | 30 | 30 | 35 | 30 | 30 |
| Component (B) | | | | | | | |
| Butyl cellosolve (parts) | 21 | — | 21 | 21 | — | — | 21 |
| Butyl carbitol (parts) | — | 16 | — | — | 16 | 21 | — |
| Component (C) | | | | | | | |
| Water (parts) | 49 | 49 | 49 | 49 | 49 | 49 | 49 |
| Components (D) | | | | | | | |
| 28% Aqueous ammonia (part) | 0.46 | — | 0.58 | 0.56 | 0.68 | 0.83 | — |
| Dimethyl ethanolamine (part) | — | 0.62 | — | — | — | — | 0.54 |
| Mixing ratio | | | | | | | |
| Weight ratio** of A/B/C | 30/21/49 | 35/16/49 | 30/21/49 | 30/21/49 | 35/16/49 | 30/21/49 | 30/21/49 |
| Weight ratio of B/B + C | 0.30 | 0.25 | 0.30 | 0.30 | 0.25 | 0.30 | 0.30 |
| Equivalent ratio of D/A | 1.0 | 1.2 | 1.2 | 1.2 | 1.2 | 1.2 | 1.2 |

*parts of solid matter
**% by weight

TABLE 5

| Example No. | 1 | 2 | 3 | 4 | 5 | 6 | 7 |
|---|---|---|---|---|---|---|---|
| Dispersion stability | ○ | ○ | △ | ○ | △-○ | △ | ○ |
| Corrosion resistance | ◉ | ◉ | ◉ | ◉ | ○ | ○ | ○ |
| Chemical resistance | | | | | | | |
| 5% NaOH | 10 | 10 | 10 | 10 | 10 | 10 | 10 |
| 5% H$_2$SO$_4$ | 10 | 10 | 10 | 10 | 10 | 10 | 10 |
| Boiling water resistance | ○ | ○ | ○ | ○ | ○ | ○ | ○ |
| Processability (5° C.) | 1T | 1T | 1T | 1T | 1T | 1T | 0T |
| Coin-scratch resistance | ◉ | ◉ | ◉ | ◉ | ○ | ◉ | ○ |

Comparative Examples 1–6

An aqueous dispersion was prepared in the same manner as in Example 1 using the components and the mixing ratios shown in Table 6. Using the obtained aqueous dispersion, primers and specimens were prepared and the film properties were determined by the same methods as mentioned above. The results are shown in Table 7.

TABLE 6

| Comparative Example No. | 1 | 2 | 3 | 4 | 5 | 6 |
|---|---|---|---|---|---|---|
| Component (A) | | | | | | |
| Polyester Kind | (a) | (h) | (i) | (j) | (k) | (l) |
| Amount* | 30 | 35 | 30 | 30 | 35 | 30 |
| Component (B) | | | | | | |
| Butyl cellosolve (parts) | 21 | — | 3 | 21 | — | 21 |
| Butyl carbitol (parts) | — | 13 | — | — | 13 | — |
| Component C) | | | | | | |
| Water (parts) | 49 | 52 | 62 | 49 | 52 | 49 |
| Components (D) | | | | | | |
| 28% Aqueous ammonia (part) | — | — | 0.67 | 0.08 | — | 0.62 |
| Dimethyl ethanolamine (part) | — | 0.62 | — | — | 0.65 | — |
| Mixing ratio | | | | | | |
| Weight ratio** of A/B/C | 30/21/49 | 35/13/52 | 35/3/62 | 30/21/49 | 35/13/52 | 30/12/49 |
| Weight ratio of B/B + C | 0.30 | 0.30 | 0.05 | 0.30 | 0.30 | 0.30 |
| Equivalent ratio of D/A | 0 | 1.2 | 1.2 | 1.2 | 1.2 | 1.2 |

*parts of solid matter
**% by weight

TABLE 7

| Com. Ex. No. | 1 | 2 | 3 | 4 | 5 | 6 | 7 | 8 |
|---|---|---|---|---|---|---|---|---|
| Dispersion stability | XX | XX | O | XX | O | O | — | — |
| Corrosion resistance | — | — | X | — | X | | | |
| Chemical resistance | | | | | | | | |
| 5% NaOH | — | — | 2D | — | 6F | 2D | 10 | 10 |
| 5% H$_2$SO$_4$ | 10 | — | 2D | — | 6M | 2D | 10 | 10 |
| Boiling water resistance | — | — | X | — | O | X | O | O |
| Processability | | | | | | | | |
| (5° C.) | — | — | 1T | — | 1T | 0T | 1T | 3T |
| Coin-scratch resistance | — | — | O | — | ⊚ | XX | X | Δ |

Comparative Example 7

A solvent primer was prepared from polyester (m) by the above-mentioned method. Specimens were prepared and film properties were determined by the same methods as mentioned above. The results are shown in Table 7.

Comparative Example 8

A solvent primer was prepared from Epycoat 1007, which is an epoxy resin made by Yuka Shell Epoxy Kabushiki Kaisha, Japan, by the above-mentioned method. Specimens were prepared and film properties were determined by the same methods as mentioned above. The results are shown in Table 7

As apparent from Tables 5 and 7, the aqueous dispersion of the present invention shows good dispersibility, and furthermore, the film prepared from the aqueous dispersion exhibits excellent film properties in terms of corrosion, chemical, boiling water, and scratch resistance and processability.

The aqueous dispersion of the present invention is markedly superior in water-dispersibility, even when the metal base of sulfonic acid has a low concentration, and is transparent. The film prepared from the aqueous dispersion is extremely advantageous in that it shows good corrosion resistance and chemical resistance, which are attributable to a low concentration of metal base of sulfonic acid comprised in thee polyester and a bisphenol A skeleton, and it exhibits excellent processability and scratch resistance, thus rendering the aqueous dispersion particularly suitable for use as a primer. Furthermore, since the film affords superior film appearance and stain resistance, the aqueous dispersion of the present invention is suitably used as a top coat or a coating composition. In addition, the aqueous dispersion has low viscosity from being a heterogeneous system, and it can be spray-coated or prepared into a high solid coating, which is unattainable with a solvent-type polyester.

What is claimed is:

1. An aqueous dispersion comprising:
   (A) a polyester having about 0.45 to about 1.00 carboxyl groups per chain end, and comprising, as a polycarboxylic acid component, an aromatic dicarboxylic acid in a proportion of about 70% to about 100% by mole based on the entire acid component, a polyol having the formula I:

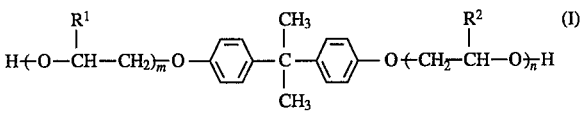

wherein each of R$^1$ and R$^2$ is a hydrogen or a methyl, and each of m and n is a numeral greater than or equal to 1, provided that $2 \leq (m+n) \leq 6$, in a proportion of about 30% to about 95% by mole based on the entire polyol component, and at least one of a dicarboxylic acid containing a metal base of sulfonic acid in a proportion of about 0.01% to about 10% by mole based on the entire acid component, and a polyol containing a metal base of sulfonic acid in a proportion of about 0.01% to about 10% by mole based on the entire polyol component, (B) a water-soluble organic compound having a boiling point of about 60° C. to about 250° C.,
   (C) water, and
   (D) a neutralizer; wherein
   the amounts of the components (A), (B), (C), and (D) satisfy the following ratios (1) to (3):
   (1) A/B/C being about 1% to about 70% by weight/about 0% to about 69% by weight/about 9% to about 99% by weight,
   (2) B/(B+C) being about 0 to about 0.7 (weight ratio), and
   (3) the equivalent ratio of D to A being about 0.1 to about 20.

2. The dispersion of claim 1, wherein said polyester has about 0.49 to about 0.65 carboxyl groups per chain end.

3. The dispersion of claim 1, wherein the number of carboxyl groups per chain end is adjusted by an addition reaction with an acid anhydride after polymerization into a polyester.

4. The dispersion of claim 1, wherein said polyester comprises at least one dicarboxylic acid containing a metal base of sulfonic acid in a proportion of about 1% to about 4% by mole based on the entire acid component, and a polyol containing a metal base of sulfonic acid in a proportion of about 1% to about 4% by mole based on the entire polyol component.

5. The dispersion of claim 1, wherein said polyester is amorphous.

6. The dispersion of claim 5, wherein said polyester has a glass transition temperature of about −30° C. to about 80° C.

7. The dispersion of claim 6, wherein said polyester has a glass transition temperature of about 30° C. to about 75° C.

8. The dispersion of claim 1, wherein said polyester comprises diethylene glycol in a proportion of about 30% to about 60% by mole based on the entire polyol component.

9. The dispersion of claim 1, wherein said polyester comprises the polyol (I) in a proportion of about 40% to about 70% by mole based on the entire polyol component.

10. The dispersion of claim 1, wherein said polyester comprises terephthalic acid in a proportion of about 40% to about 60% by mole based on the entire acid component.

11. The dispersion of claim 1, wherein said component (B) has a water-solubility of not less than about 20 g per liter of water at 20° C.

12. The dispersion of claim 1, wherein said component (B) has a boiling temperature of 60° C. to 250° C.

13. The dispersion of claim 1, wherein said polyester comprises said dicarboxylic acid containing a metal base of sulfonic acid in a proportion of about 1% to about 4% by mole based on the entire acid component.

14. The dispersion of claim 1, wherein said polyester comprises said polyol containing a metal base of sulfonic acid in a proportion of about 1% to 4% by mole based on the entire polyol component.

15. The dispersion of claim 1, wherein said dispersion is in the form of an aqueous primer.

16. The aqueous primer of claim 15, which further comprises an alkyl-etherified aminoformaldehyde.

17. The aqueous primer of claim 16, which further comprises an accelerator.

18. The aqueous primer of claim 17, wherein the accelerator is p-toluene-sulfonic acid.

19. The aqueous primer of claim 17, which further comprises at least one selected from the group consisting of zinc chromate, titanium dioxide and glass beads.

20. The aqueous primer of claim 19, which comprises about 100 parts (solid matter) of the aqueous dispersion, about 10 parts (solid matter) of the alkyl-etherified aminoformaldehyde resin, about 0.25 part of the accelerator, about 30 parts of zinc chromate, about 50 parts of titanium oxide, and about 250 parts of glass beads having an average diameter of around 5 mm.

21. The aqueous primer of claim 20, wherein the accelerator is p-toluene-sulfonic acid.

* * * * *